Patented Jan. 7, 1930

1,742,324

UNITED STATES PATENT OFFICE

WALTER O. SNELLING, OF ALLENTOWN, PENNSYLVANIA

CURRENT-RECTIFYING DEVICE

No Drawing.   Application filed January 26, 1923.   Serial No. 615,160.

My invention relates to current rectifying devices of the general nature of natural crystal detectors, and more particularly relates to improvements in contact rectifiers, electric valves, contact detectors, and like devices having the property of detecting and amplifying radio and other ether waves.

I have discovered that by bringing about a reaction between the oxide of a suitable metal and an element of the sulfur group, I obtain a product which possesses current rectifying properties to a marked degree, and in addition is capable of being modified over a wide range as to form, shape, electrical resistance, quality and quantity of current rectification, and in other similar ways. This ability to modify the physical characteristics and the rectifying, detecting and amplifying qualities of my product, gives my invention exceptional flexibility, and enables it to be used for a large number of purposes for which previously known rectifiers of the contact or crystal type were of little or no value.

As an example of my invention, I will describe one method by which I am able to make a contact rectifying product in the form of a tablet or button, and possessing practically uniform and exceptionally high rectifying characteristics over its entire surface. I first take 685 parts by weight of plumbic tetroxide, commonly known as minium or red lead, and with this I mix 160 parts by weight of flowers of sulfur. The red lead should preferably be in the form of a fine powder, and the flowers of sulfur may be the ordinary commercial material. After thoroughly incorporating the two constituents, the mixture is next placed in a form or mold, having the shape that is desired for the finished pellet or button. Pressure is now applied by means of a hand press, where only light pressure is required, or by means of a hydraulic or mechanical press, where higher pressures are desirable. The influence of pressure, and the desirability of using high pressures, will be hereinafter more fully set forth.

Having by means of suitable pressure consolidated the mixture into the form desired, a reaction is brought about by heating the pellet or button. At a temperature somewhat above the melting point of sulfur a reaction takes place between the two constituents, the activity or vigor of this reaction being dependent on the pressure with which the mass has been consolidated. By the use of pressures of from 20 kg. to 100 kg. per square centimeter, the mass is sufficiently consolidated so that the reaction goes on slowly and quietly, but much higher pressures may be used to advantage. When the reaction is complete I may heat the pellet or button to a red heat, preferably in a chamber containing sulfur vapor, or in a chamber containing mainly inert gas. I can perform this heating operation in the air, without the use of a special treating chamber, providing the heating period is not too long, but I obtain superior results by heating in a special chamber containing sulfur vapor or inert gas. I also obtain satisfactory results by performing my heating operations in a partially evacuated chamber.

The product obtained by following the method above described is a gray solid, having whatever form and shape was imparted to the base mix at the time of consolidating or briquetting. A very slight shrinkage in volume occurs during the course of manufacture, but this is only plainly noticeable in the case of larger reaction masses. The surface of the pellet or button will be found to be rough or smooth, according to the surface of the mold which came in contact with the corresponding face of the button or pellet. The exceptional importance of this feature, as a practical matter, will of course be apparent. In making detector elements or amplifying elements where exceptional uniformity is desired over the entire surface presented by the rectifying element, I prefer to use a polished or planished surface for my mold. By the use of such a surface in my mold, I obtain a glass-smooth surface on my contact element, and when the proper treatment as described has been given in the preparation of the pellet, this surface will possess practically uniform sensitivity over its entire area. Accordingly, when used in the ordinary "cat whisker" type of detector stand, the contact wire or "cat whisker" may be brought in contact with any part of the exposed surface of the contact element with the assurance of obtaining reception of any incoming signals. Uniformity of sensitiveness over the entire surface, and the ability to use a perfectly plain or smooth surface, is of course of extreme importance in using apparatus which is being transported or moved while in operation. Up to the present time the inability of such "crystal detectors" as have been previously used, to give satisfactory results when moved or subjected to vibration or jarring has greatly limited the field of usefulness of radio apparatus of the contact type. For portable sets for use in warfare it has been found necessary to abandon the use of the sensitive "cat whisker" type of detector, and substitute less sensitive but more stable types of pressure detectors. Contact elements made according to my present invention, and having a glass-smooth surface of uniform sensitivity, are free from the objections which have in the past so seriously limited the use of the "cat whisker" type of detector.

It will be evident that it is not necessary that the exposed surface of my detector elements should be smooth however, and for certain purposes I find it desirable to given an indented or otherwise irregular surface to my contact element, by employing a suitably shaped mold. I find, for example, that for certain purposes contact elements having concentric grooves indented in the surface have certain advantages, and can be used in a new type of detector stand that permits of exceptionally simple adjustment. For other purposes I find it desirable to indent the active surface of my contact element with small pits or depressions, for the purpose of receiving a contact wire or other contact electrode, and the ability of my new product to be pressed or molded into any desired shape gives it a wide field of usefulness in the construction of many special types of electro-magnetic wave receiving, current rectifying and signal amplifying devices.

The moldable characteristics of my new reaction products also gives them advantages in mounting which have not been possessed by previously known contact detector elements. I may for example press my base mix directly into a cup of any suitable material, such as aluminum, before bringing about the reaction between the components of the material, and I may use such cup as a permanent mounting for the detector element. By employing a cup of a suitable metal, the cup itself will form one electrode of the detecting device, to which wires may be conveniently connected. By employing a glass or porcelain cup, and pressing my base mix into such cup while suitably supporting the cup to prevent its rupture from the pressure employed, I obtain a contact element in an electrically insulating casing, which has advantages in connection with certain types of detector and amplifying devices made possible by the use of my new rectifying product. For certain purposes it is convenient to have both electrodes of a rectifying element permanently attached to the element, as a part of same, and this can be readily brought about with my new product, by forcing my base mix into a suitable conducting cup, and inserting a fine wire or other suitable electrode into the reaction mixture before bringing about the reaction between its components. For example, I have made current rectifying and signal amplifying devices having new and interesting properties by pressing my reaction mixture into a metal cup, and imbedding a fine wire of a suitable metal in the reaction mass before reaction, in suitable position as regards to the cup. I find that electrodes of gold, platinum or aluminum may be used in the manner described, and enable rectifying, detecting and amplifying units to be made, which are free from adjustable or movable parts and which have certain unique and very valuable characteristics. Instead of using a cup as one electrode and an imbedded wire as another electrode, I may use two imbedded wires as electrodes, and these wires may be of the same or of different metals, according to the intended use of the rectifying element.

Although for most purposes a current rectifying device which is of uniform and high sensitiveness is of principal interest, there are a few purposes for which current rectifiers or detectors of extremely irregular or "spotty" sensitiveness are of great interest. Up to now the cause of "sensitive spots" in crystal rectifiers has been unknown, and the control of the sensitiveness of such rectifiers has been impossible. I have discovered ways of modifying my reaction product that enable me to obtain products having either high sensitiveness or low sensitiveness, and having either uniform rectifying characteristics, or "spotty" rectifying characteristics. This is an important feature of my invention, and enables me to obtain current rectifying devices of controllable characteristics, and possessing practically any desired range of current conductivity, current rectification, current sensitivity, and rectification uniformity. I have already mentioned that by employing finely divided raw materials and high pressure in the forming, molding or briquetting of my base mix before reaction, I obtain great uniformity of rectifying ability over the entire active surface of the resulting reaction product. I find that by adding a greater or less proportion of either of my raw materials in the form of coarse particles, I obtain centers of sensitiveness in my resulting element, and by employing part of my sulfur as flowers of sulfur and part as crushed brimstone of any desired mesh, or by employing part of my red lead as the finely powdered material, and part as lumps or consolidated grains, I am able to modify the "spotty" characteristics of my new rectifying element over a wide range, from products on the one side which possess substantial rectifying uniformity over the entire exposed surface, to products on the other hand having any desired number of selective or sensitive spots.

Where it is desired to obtain maximum irregularity in the rectifying characteristics of various portions of the surface of my rectifying device, I incorporate fine filings or particles of a suitable material in the base mix. The particles so added may be varied, from metallic filings on the one hand, to particles of ground glass on the other hand. By using filings of gold, or particles of aluminum, interspersed through my reaction mass I obtain centers of great selectivity and rectifying ability, in a detector of very high electrical conductivity, and by using particles of ground glass I obtain centers of zero selectivity or absolute inertness. While for most purposes this extreme range of selectivity and this maximum degree of spottiness is not desirable, I am giving the illustration for the purpose of showing that with my new reaction masses the range of selectivity may be varied at will from maximum sensitiveness to absolute inertness.

The reaction product which I obtain by my present invention is not a material of physical homogeneity, like glass or slag for example, but instead is an aggregate of very minute particles forming a net-work or open structure. When very high pressures are used in consolidating my base mix before reaction, the openings in the mass of particles making up the product are very fine, and the open spaces in the product can only be detected by powerful magnification, but when low pressures are used in consolidating my base mix before reaction, the structure is notably open and loose, and the density of structure may be varied at will from a friable chalk-like product as one extreme, to a very hard and tough material as the other extreme. As products of a loosely coherent structure possess desirable properties for certain purposes, I find it of advantage to employ such products for certain specific uses, but I find the soft and friable nature of these loosely consolidated materials is a disadvantage to their general use. I find that this difficulty can be obviated, and all of the desirable properties of loosely consolidated reaction mixtures can be obtained with practically any desired mechanical strength, by taking advantage of the porosity of my new product as a means of introducing a supporting and cementing agent into the minute spaces between the particles making up the structure net-work. For example, where the rectifying properties of a loosely consolidated product are required, in conjunction with considerable mechanical strength in the button or element, I may impregnate the finished button or element with ordinary collodion solution. After the evaporation of the solvent the product will be found to have high mechanical strength, while still retaining the open net-work structure and the original rectifying characteristics of the original reaction product. If so much collodion solution is used as to leave a non-conducting skin over the surface of the rectifying element, it is of course necessary to dissolve away this excess by washing the surface with a little solvent, or by mechanically abrading the surface of the rectifying element. It will of course be evident that other varnishes or cements may be used as substitutes for collodion solution.

For certain purposes it is very desirable to obtain a loose or open structure in a detector element, while still employing a very high pressure in the consolidating of the block of material. I have discovered that I can obtain loose or open structure in my final product, by employing an excess of an element of the sulfur group in my base mix. For example, by using 600 parts by weight of red lead and 200 parts by weight of flowers of sulfur, and compressing to the same pressure that is used with the standard reaction mix of 685 parts of red lead and 160 parts of sulfur, I obtain a less dense and more porous product after my final reaction. The excess of an element of the sulfur group which is present is volatilized in the final heating treatment, my product being sufficiently porous when made in the manner described to permit of the passage of the excess of sulfur in vaporous condition through the material during the heating treatment. It will of course be evident that other volatile materials than sulfur may be used for the purpose mentioned, and such materials may be either an excess of the active element of the sulfur group used in the mix, or may be a volatile added material, such as mercury sulfide, but in regulating and controlling the porosity of highly compressed reaction mixtures I prefer to employ an excess or deficiency of sulfur group element, this usually being sulfur or selenium. Where it is desirable to obtain excessive density and low electrical resistance in my final reaction product I find that by moistening the mixture of oxide and an element of the sulfur group somewhat with water or other suitable fluid before compressing, or by compressing an unmoistened mixture at a temperature slightly in excess of the melting point of the element of the sulfur group employed, so that the element is present in the mix in liquid form, I obtain finished products which possess extremely high density, and which are extremely hard and tough.

Although I have up to now only referred specifically to the use of red lead and sulfur as the raw materials to be used in the practice of my invention, it is not to be understood that these are the only materials which can be successfully used. As substitutes for red lead I have used with success other oxides of lead, and the oxide of other metals than lead. Plumbic oxide, commonly known as lead monoxide or litharge, may be used in the practice of my invention, and gives products substantially equal in quality to those obtained by the use of red lead. On account of the easy ignitability of lead peroxide when in contact with an oxidizable material, I do not find it as satisfactory to use this material alone with an element of the sulfur group as the use of either red lead or litharge. I find however, that the addition of a small amount of lead peroxide to either the litharge or the red lead used in making up my base mixture, leads to an increase in the sensitiveness of the resulting reaction product, and accordingly in the preparation of quite sensitive products I find it desirable to add a small amount of lead peroxide. Among the oxides of other metals which give good results when used in connection with my persent invention, I may mention among other the oxides of bismuth, mercury, copper and nickel. Although the cheapness of the oxides of lead make these the most satisfactory raw materials for the practice of my invention, I do not wish to limit myself to the use of oxides of lead alone, as very good products can be obtained by using oxide of bismuth, oxide of copper, or other suitable metallic oxides. When oxide of mercury is used in the practice of my invention only moderate heating of the reaction product should be given, as the reaction product in its porous state is quite volatile at high temperatures.

Although I have referred specifically to sulfur as the element of the sulfur group which I prefer to use, I have obtained very reactive rectifying elements of extremely desirable physical properties by the use of other elements of the sulfur group such as selenium and tellurium. A small amount of selenium mixed with sulfur seems to slightly increase the rectifying properties of the resulting product when treated in accordance with the general principles of my invention, and appears to have catalytic or electro-ionic properties, and although I do not have positive proof that a small amount of selenium in sulfur acts catalytically, there is some available evidence to support this belief. I find for example that although sulfide of strontium is not itself a rectifier, the addition of a few percent of sulfide of strontium to the reaction masses made up in accordance with my present invention gives them increased selectivity when they are consolidated at low or medium pressures, and it may be that other cases which I have noted, where small amounts of other materials than the primary oxide and the primary metalloid give increased selectivity when added to the base mix, are due to disturbances of the intermolecular ionic structure net-work of the product which I obtain. Among the principal catalytic agents which I use I may mention the addition of small amounts of lead peroxide to a red lead or a litharge reaction mass, the addition of a small amount of selenium to a reaction mass in which the principal element of the sulfur group is sulfur, the addition of a small amount of lead oxide to a reaction mass in which the principal metal oxide is bismuth trioxide, and the addition of small amounts of bismuth oxide to a reaction mass in which the principal metal oxide is lead oxide.

The essential feature of my invention is the production of current rectifying products by the chemical interaction of an element of the sulfur group and the oxide of a metal. Although it will be evident that the simplest and for practically all purposes the best method of bringing about such reaction is the mixing of the reacting products in pulverulent form, I do not wish to confine myself to this particular method of manufacturing my reaction product. By melting an element of the sulfur group and adding the oxide of a metal to the molten mass, and by contacting a metal oxide with the vapor of an element of the sulfur group, I can also obtain reaction products having current rectifying properties. In one form of my present invention I consolidate a mass of the oxide of a metal into any suitable form, and I then expose the product so prepared to the vapor of an element of the sulfur group. I do not find that this method of treatment offers any advantages over my preferred method of treatment, and I have given the illustration only for the purpose of pointing out that I do not confine myself to any particular way of bringing about the reaction between a suitable metal oxide and a suitable element of the sulfur group, and I broadly claim as current rectifiers the reaction products of the oxides of metals such as lead, copper, bismuth, mercury and nickel, with elements of the sulfur group such as sulfur, selenium and tellurium. I prefer to employ molecular quantities of the reacting materials, for example using 685 parts of red lead and 160 parts of sulfur in the reaction mixture of these two materials, according to the following equation:

$$Pb_3O_4 + 5S = 3PbS + SO_2$$

Using litharge and sulfur, the reaction is:

$$2PbO + 3S = 2PbS + SO_2$$

Although I find that in general I obtain satisfactory results by the use of molecular quantities of my reacting components, I do not believe that the reaction proceeds strictly in accordance with such equations as given. My product does not appear to be simply a mixture of sulfide crystals, but on the contrary seems to contain a small amount of unreduced oxide, and also traces of oxidation products such as sulfates and thiosulfates. As my products are far more selective and rectifying than the sulfides of the same metals obtained in other ways than by the reduction of an oxide in the manner described, it is likely that the presence of traces of unreduced oxide and of oxidation products such as sulfates and thiosulfates may play an important part in giving to my products their exceptional efficiency as rectifiers of alternating currents and as detectors of ether vibrations. It is possible that the effective agent may be thin films of oxide, sulfate, thiosulfate or other product made during the reaction, and which may coat the interlacing crystals at their points of contact or their surfaces of contact.

It is interesting to note that original surfaces of my product, meaning the surfaces originally present on the compressed button, tablet or block, are considerably more sensitive as rectifiers than surfaces of fracture. I do not know the cause of this, but the fact is certain, and I find that I obtain greatly improved reception on original surfaces of my product, as compared with surfaces obtained by breaking up or fracturing masses of my product. Accordingly I prefer to make my product up in blocks or buttons of the size and shape desired for the finished rectifier, rather than to make a large mass of the product and then break this up into smaller parts. I may, however, obtain somewhat the same result by making up my product in thin blocks of considerable surface, and then break these up so that each rectifier unit will have as its active surface a part of the original surface of the reaction mass.

Although I find the use of molecular quantities of my reacting components to give me in general satisfactory results, yet it should be remembered that an excess or deficiency of element of the sulfur group over the amount required by molecular proportions is often of advantage, in obtaining a desired density of structure of the resulting product. It will also be evident to those skilled in chemistry that not all metallic oxides are capable of reacting with certain elements of the sulfur group, with the production of compounds of the metal and the element of the sulfur group. Oxide of lead reacts readily with sulfur, selenium and tellurium, to form excellent products. Bismuth is less reactive, but still gives very good reaction products, particularly with sulfur, while copper, mercury and nickel give products which are progressively less satisfactory. Under these circumstances I prefer to employ in the practice of my invention the oxides of lead and bismuth, but other oxides which react with elements of the sulfur group to form combinations of the metal and the element of the sulfur group may be used, although most of these bodies do not possess rectifying characteristics to the same striking extent as the reaction products of lead oxide and an element of the sulfur group such as sulfur, selenium and tellurium, and accordingly I prefer in the practice of my invention to use the more sensitive and the more reactive products obtained by the reaction of the oxides of lead with sulfur, selenium and tellurium, and of the oxide of bismuth with sulfur.

In bringing about the reaction between a mixture of a suitable metallic oxide and a suitable element of the sulfur group, I find it of advantage with sluggishly reacting combinations to raise the temperature of the mixture gradually, up to the point of ignition. To those familiar with the chemical art it will be evident that when oxides having relatively high heats of formation are used in combination with metalloids whose compounds with the metal do not represent high heats of formation, there is relatively little tendency for the element of the sulfur group to reduce the oxide. In such a case the heating of all of the mixture to the reaction temperature, by the aid of outside heat, increases the ability of the reaction to proceed. In making reaction products of lead oxide with sulfur, there is sufficient energy evolved in the reaction to enable it to go on through the mass of the cold mixture, and the vigor of the reaction is of course increased by the presence of oxides, such as lead peroxide, which contain loosely combined oxygen. For most reaction mixtures however, the addition of outside heat to that supplied by the reaction itself is of advantage, and I also find that a considerable excess of the element of the sulfur group tends to assist a sluggish reaction to proceed to the desired extent.

It will be evident that my invention is of extremely wide applicability in the preparation of current rectifying products, and it has already opened up a number of new fields in the application of electro-magnetic wave detectors of the contact type. I will not specifically mention in this application the various ways in which my new contact rectifying elements may be used for the rectifying of currents, the detection of ether waves, and the reception and amplification of radio signals, as it will be evident to any one skilled in the art that my new rectifying elements may be used in ordinary crystal detector circuits with or without a source of battery current, and may be employed in many ways as rectifiers of alternating electric currents. It will also be evident that my invention is of particularly great flexibility, and that the physical and chemical characteristics of my products may be varied through an extremely wide range, without departing from the essence of my disclosure. Accordingly no limitations should be placed on my invention, except such as are indicated by the appended claims.

I claim:

1. A contact rectifier comprising a porous mass of a compound of a metal with an element of the sulfur group.

2. A contact rectifier comprising a metallic sulfide in porous condition.

3. As a new composition of matter, a porous mass of a compound of a metal with an element of the sulfur group having current rectifying properties.

In testimony whereof, I have hereunto subscribed my name this 25th day of January, 1923.

WALTER O. SNELLING.